United States Patent [19]
De La Huerga et al.

[11] Patent Number: 5,895,461
[45] Date of Patent: Apr. 20, 1999

[54] METHOD AND SYSTEM FOR AUTOMATED DATA STORAGE AND RETRIEVAL WITH UNIFORM ADDRESSING SCHEME

[75] Inventors: Carlos De La Huerga, River Hills, Wis.; William E. Craig, San Antonio, Tex.

[73] Assignee: Telaric, Inc., San Antonio, Tex.

[21] Appl. No.: 08/727,293

[22] Filed: Oct. 9, 1996

Related U.S. Application Data

[60] Provisional application No. 60/023,126, Jul. 30, 1996.

[51] Int. Cl.$^6$ ............................................. G06F 17/00
[52] U.S. Cl. ............................ 707/1; 707/2; 707/100; 707/104; 707/200
[58] Field of Search ........................... 707/1, 10, 2, 100, 707/200, 104

[56] References Cited

U.S. PATENT DOCUMENTS

| | | | |
|---|---|---|---|
| 3,872,448 | 3/1975 | Mitchell | 705/3 |
| 4,958,283 | 9/1990 | Tawara et al. | 382/131 |
| 5,253,362 | 10/1993 | Nolan et al. | 707/1 |
| 5,361,202 | 11/1994 | Doue | 705/3 |
| 5,377,323 | 12/1994 | Vasudevan | 395/200 |
| 5,506,984 | 4/1996 | Miller | 707/10 |

*Primary Examiner*—Thomas G. Black
*Assistant Examiner*—Donald Min
*Attorney, Agent, or Firm*—Akin, Gump, Strauss, Hauer & Feld, L.L.P.

[57] ABSTRACT

A computer system wherein data records are created, stored and retrieved from predetermined addresses on a plurality of databases using a specialized word processor that recognizes keywords entered by the user and associates those keywords with the unique addresses of the data records to which they refer. Each data record created for storing on the system is automatically stored at a predetermined, unique address by a word processor according to keywords entered into the data record by a user. Users creating data records may reference other data records by the use of keywords which uniquely identify those other records. References to other data records cause a word processor to create hypertext links to those other data records so that users may retrieve them without knowing where they are stored on the computer system. The word processor monitors data input to a record by a user to determine when a keyword is being entered, and assists users in identifying correct keywords which point to the data records which they desire to retrieve or refer to.

60 Claims, 17 Drawing Sheets

Text As It Appears in the Word Processor

600 — ID: 987654321
602 — Date: 14-May-1996
604 —
606 — Report type: Admission report
608 — Written by: Dr. S. E. Markelson The admission ecg has clear evidence of left ventricular
hypertrophy when compared to the current ecg for this patient.
608 —

The previous discharge cath results indicated no evidence of any — 608
significant lesions.

The admission CK enzyme results are above normal limits.

Text after Being Converted to HTML with Hypertext Links Added

```
<html>
<body>
<a href= "http://hww.st_mary.springfield/demographics/987654321/14_May_1996">
ID: 987654321</a><br>
Date: 14-May-1996<br>
Report type: Admission report
Written by:   <a href="http://hww.st_mary.springfield/staff_directory/S._E._Markelson">
Dr. S. E. Markelson</a><br>
<br>
The <a href="http://hww.st_mary.springfield/ecg/987654321/14_May_1996/00:00/admit">
admission ecg </a> has clear evidence of left ventricular hypertrophy when compared to the
 <a href="http://hww.st_mary.springfield/ecg/987654321/14_May_1996/00:00/current">
previous ecg  </a> for this patient.<br>
<br>
The
<a href="http://hww.st_mary.springfield/cath/987654321/14_May_1996/00:00/prev_discharge">
previous discharge cath </a> results indicated no evidence of any significant occlusions.<br>
<br>
The
<a href="http://hww.st_mary.springfield/lab_CK_enz/987654321/14_May_1996/00:00/admit">
admission CK enzyme </a>results are above normal limits.<br>

</body>
</html>
```

Fig. 8

Text As Viewed by a Request Handler Routine

ID: 987654321
Date: 14-May-1996
Report type: Admission report
Written by: Dr. S. E. Markelson The admission ecg has clear evidence of left ventricular hypertrophy when compared to the current ecg for this patient.

The previous discharge cath results indicated no evidence of any significant lesions.

The admission CK enzyme results are above normal limits.

Fig. 9

METHOD AND SYSTEM FOR AUTOMATED DATA STORAGE AND RETRIEVAL WITH UNIFORM ADDRESSING SCHEME

RELATED CASES

This application claims priority from co-pending provisional application Ser. No. 60/023,126, filed Jul. 30, 1996.

FIELD OF THE INVENTION

The present invention relates to the storage and retrieval of data on computer systems. More particularly, the present invention relates to a computer system for automatically storing and retrieving data records based on a predetermined file naming structure, wherein users of the system create and access data records using keywords without knowing the location of the data records on the computer system.

BACKGROUND OF THE INVENTION

The rapid growth of computer networking capabilities has led to the widespread implementation of multi-user computer systems wherein data from various sources is stored in databases distributed throughout the system. Such distributed database environments may result from the use of multiple file servers on a network of hosts, workstations, or user terminals. They may also result from the networking of multiple, disparate host computer systems, where each host computer may have different operating system capabilities, applications software, and data file formats.

In a multi-user environment where data records are to be created and shared among numerous users, data records are constantly being created by different users and stored in one or more of the computer system's databases. In a data-intensive environment, hundreds or thousands of separate data records may be created and stored in a single working day. Unless there is a comprehensive, uniform addressing scheme in place for ensuring that each user who creates a data record stores the record in a place on the system (e.g., database, directory and file name) where other users can readily locate the record, the location of the data records will rapidly become randomized so that no user can find the data records created by himself or others.

A typical example of such a computer system appears in hospitals, where often many disparate computer systems are employed to create and store different types of patient data in the format of patient reports or observations. Conventionally, patient admission data (name, address, insurance information, doctor, etc.) is entered and stored on a mainframe computer. During the patient's stay, other medical records for the patient are created and stored on databases at other locations in the hospital. For example, X-ray data may be stored as an image file on a computer and associated database in the Radiology Lab, nurses reports on the patient may be created and stored on still another database, and data reflecting the output of patient monitoring devices or electrocardiographs may be stored on still other databases. Each patient data record or report is typically created and stored by hospital personnel who have little or no knowledge of the characteristics of the databases other than the one with which he or she usually works, and thus most personnel do not know how to access a particular patient's numerous medical data records throughout the various computer systems in the hospital. Often, the various computer systems are not even linked, since it would be of little use for a nurse to have access to the Radiology Lab computer if he or she does not know how to locate data records on the Radiology Lab's computer.

It is known to link such disparate computer systems together and employ a standardized addressing scheme (e.g., file naming convention and predetermined directory structure) so that all patient data records are stored at a predetermined location upon their creation. However, this requires that all hospital personnel learn the addressing scheme and correctly apply it every time a report is created. But when the number of disparate computer systems to be linked and the number of different type of patient data reports becomes even moderately large, it becomes impractical for personnel to remember and correctly apply the attendant addressing scheme. And although the difficulty of recalling a complex standardized addressing scheme need be overcome only once for creating and storing a data record, it is encountered repeatedly thereafter by users who are attempting to retrieve the particular data record.

It is also known to use a software-based search engine to locate the desired data record on a distributed database system having numerous such records. Such search tools may search only specific fields in the target data records, or they may perform full-text Boolean searching based on keywords entered by the user. The use of such search engines for data retrieval suffers from numerous disadvantages. They can be slow, particularly where the number of stored data records to be searched is large. In addition, full-text searching requires periodic, time consuming, computationally intensive software indexing of all data records, and this index information requires memory storage which may approach the size of the data records themselves. Moreover, search tools only aid in the retrieval of desired data records; they do not aid in the orderly storage of newly-created data records. Nor do they permit a user creating a first data record to conveniently reference in that record a second, different data record so that the reader of the first data record can readily find the referenced record when reading the first data record.

Although the use of search engines has the disadvantages described, their focus on the use of "keywords" has the advantage of allowing users without significant computer skills to locate data records using just a few words which are likely to be, either alone or in combination with each other, peculiar to the data record sought. The use of keywords may be particularly advantageous where numerous specialized computer databases are linked together, such as in the hospital environment. In the example given above, the desired patient medical data record can often be uniquely identified by just a few keywords. Typically, what is sought to be retrieved is a particular type of report on a particular patient on a particular date, and this report can often thus be identified using three keywords designating these three criteria.

One technique for using keywords has become commonplace on the global computer network known as the Internet. Stored on database/servers on the Internet are thousands of data records which contain references to still other data records in the form of textual or graphic "hypertext links." These hypertext links are merely associations between keywords in a data file and an address pointer which points to another data record, or file. The keyword and address pointer combinations are created by the use of software packages that convert standard word processing files to files in the well-known Hypertext Markup Language (HTML). Upon viewing a file in HTML format with a "browser" software package, a user can readily identify the keywords and graphic images which point to another file on the Internet, i.e., constitute a hypertext link. When these hypertext links are selected by the user, the browser software receives the Internet address of the file referenced by the chosen keyword, and that file is opened for viewing by the user. In this way, users can readily access other referenced files without knowing their location on the Internet. Likewise, one who is creating a particular data record can store it at a predetermined address and reference it in other data records by the use of hypertext links which point to the address of the data record referred to.

The storage and retrieval of files on the Internet using hypertext links has several disadvantages, however. First, there is virtually no standardization to the addressing of files created and stored by the millions of users. Thus, even if user A knows that user B will create a particular type of file and store it for access by others, A has no idea what address that file will be stored at. Consequently, user A cannot create his data records with hypertext links to user B's records in advance. And even if user A can wait until after user B's file is stored and made available, A cannot create his hypertext links without first learning where B's file is stored.

Second, even if a standardized addressing scheme existed, all of the hypertext links would still have to be constructed individually, with the file address pointers entered manually when hypertext links are created using HTML conversion packages. The attendant margin for human error in establishing the hypertext links is large.

What is needed is a computer system which permits both the storage and the retrieval of data records according to a standardized addressing scheme which can be determined solely by the use of certain keywords known to the various users of the system. Such a system could employ standard word processing software to enable multiple users to create and reference the various data records. The system would recognize certain keywords entered by the user during creation of the data record and use those keywords to determine the appropriate location (e.g., database, directory and file name) to store the record according to a predetermined addressing scheme. Similarly, it is desirable for the users of the system to be able to locate particular data records using a few keywords without having to know the complexities of which database the record is on, the format of the record, the file name or the directory address.

SUMMARY OF THE INVENTION

The present invention provides a word processor employing a standardized addressing scheme, wherein the word processor recognizes keywords entered by a user who is either creating and storing a data record or attempting to locate a data record among numerous data records at different addresses on a plurality of computer databases.

Thus, the present invention provides first a plurality of databases on which a variety of data records are stored. The databases are in communication with one or more processors which interpret input data from a user interface and direct the storage and retrieval of data records. The databases and processors may be linked via a network, or one or more of the databases may communicate locally with an associated processor, as in a personal computer. The invention also provides a plurality of user interfaces, such as combinations of keyboards and video displays, through which system users create, store, retrieve and display data records. These user interfaces can be simple terminals which communicate with a processor and a database over the network, or they can be part of an integrated interface/processor combination, such as in a personal computer.

For accepting keywords from the user and determining the storage location of a data record to be stored or retrieved, the invention includes a word processor having certain defined functions. For the creation of data records, the word processor accepts various information from the user to identify the user and the type of record being created, as well as other information which may uniquely identify the record and its storage location after the record is completed and saved, or "published." The word processor uses these keywords, or specialized information fields, to determine the location at which the record is to be stored and employs a standardized addressing scheme compatible with or comparable to the Universal Resource Locator (URL) addressing used on the global computer network (Internet). The word processor automatically creates a link between the keyword in the data record and the address of the data record on the computer system.

The word processor also includes a function which compares text entered by the user to a predetermined list of keywords known to be used in the system and may prompt the user for a different keyword when no match is found. Once the user enters a sufficient number of recognized keywords to uniquely identify the data record being created or sought, the word processor determines the unique address of the data record according to a predetermined, standardized addressing scheme so that the record may be stored or retrieved.

When a data record is created and stored, the word processor creates a link, in the manner of a hypertext link, between a keyword uniquely identifying the particular record and its unique address (URL) on the computer system. This link points to the unique address of the record and will enable other users to retrieve the record when the same keyword is used in a request for a data record. In the same manner, other data records containing this same keyword will contain a link to that record, permitting users to create data records which refer to other data records by use of a hypertext link.

The word processor included in the invention contains a monitoring function which monitors free text entered by the user to determine whether the user is creating a hypertext reference at a place in the data record other than in a specified keyword field. This monitoring function continuously surveys text/data being input by the user so that hypertext links in a data record or report can be created by the user at will.

The word processor also includes an editing function which permits keywords, or hypertext references, in data records to be edited and determines whether a user is changing the keyword to another keyword or a non-keyword. This editing function attempts to match changed keywords with other known keywords to determine whether the user is referencing a different data record. The word processor treats keywords or keyword phrases as singularities which cannot be edited without either deleting the link (URL) associated with the keyword or changing the hypertext link to a different hypertext link.

The addressing scheme and hypertext links of the invention are suitable to be created by and used with conventional tools in common use for publishing documents on the Internet. Data records containing keywords and hypertext links may be created in Hypertext Markup Language (HTML), and the addressing scheme may comport with Internet URL addressing. Thus, the invention provides "intranet" capabilities and may be operated with relatively inexpensive, commercially available HTML formatting software and Internet browser software. Other hypertext link preparation methods and other addressing schemes are possible.

BRIEF DESCRIPTION OF THE DRAWINGS

FIG. 7 is a graphical representation of a sample patient report during its creation by a user of the computer system according to the invention.

FIG. 8 is a graphical representation of text of the report of FIG. 7 after being converted to HTML format and having hypertext links to URL addresses substituted for their associated keywords.

FIG. 9 is a graphical representation of the report of FIG. 7 with hypertext links, as viewed by a system user with a network browser or other request handler routine.

DESCRIPTION OF THE PREFERRED EMBODIMENT

The present invention may be adapted for use in a wide variety of applications, and is suitable for any environment in which numerous data records are to be stored and retrieved by users who do not know a priori the location (database, path and filename) of the records desired to be created and used, or when the means of constructing the address is complicated and prone to error. By way of illustration and not by way of limitation, the preferred embodiment is presented in the context of a hospital environment, in which typically there are numerous computer systems in use by various health care professionals throughout the hospital, and each professional often desires to have access to the patient records created by other professionals in the hospital.

Figure 1:
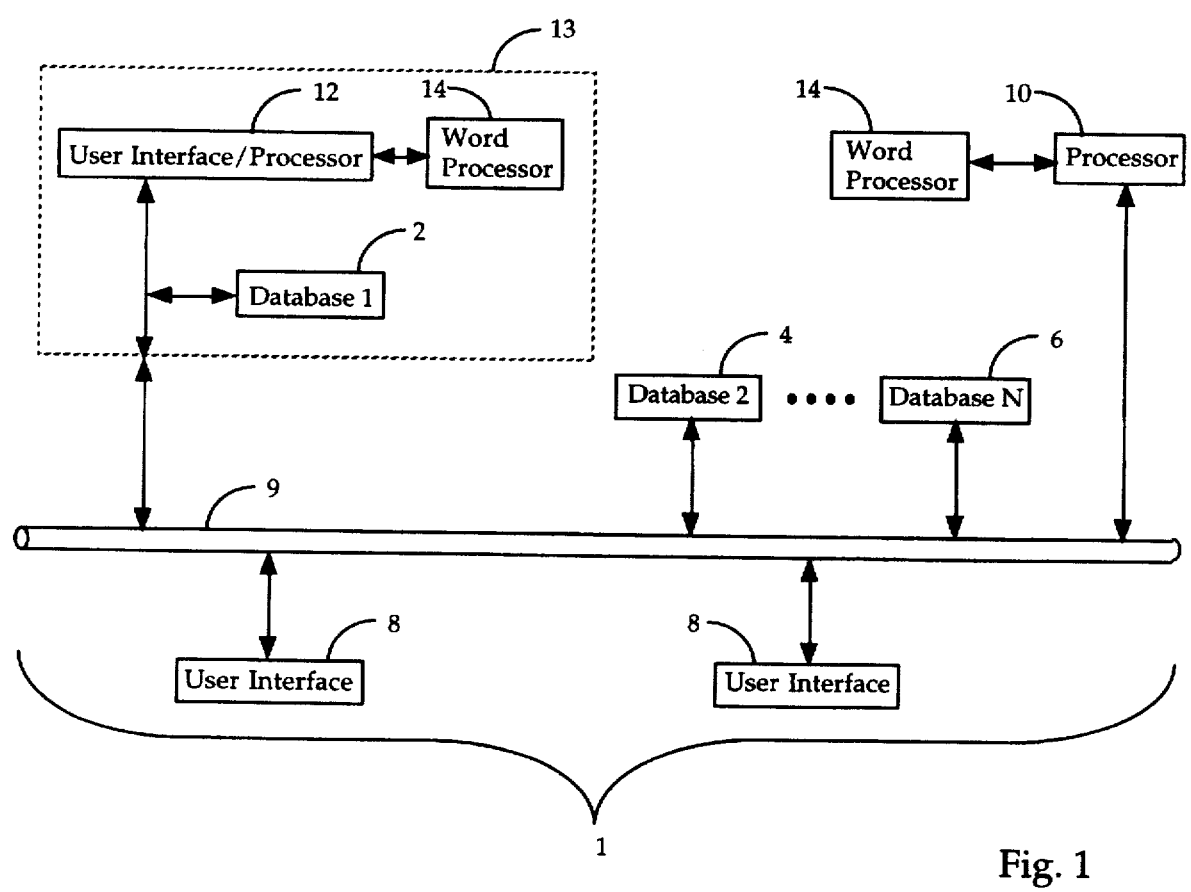
FIG. 1 is a block diagram of a computer system according to the present invention, including a plurality of databases for data record storage and a word processor which recognizes keywords that point to a unique address for each data record.

Referring now to FIG. 1, the invention is illustrated as a computer system 1 including a plurality of databases comprising databases 2 and 4 (designated "Database 1" and "Database 2"), and possibly including other databases up to the Nth database 6. "Database" may include any form for storing data for more than a transitory duration, such as conventional hard disk drives, magnetic tape storage, or optical storage media. Data records from each of these databases are available to various user interfaces 8 via a data link 9. User interfaces 8 may be any means for permitting users to create data records and/or retrieve data records from the computer system, such as the well known keyboard and video terminal combination. A user interface 8 may communicate with database 2 or 4 via data link 9, which is typically a local area network or wide area network. In such a configuration, data input and data requests are handled by processor 10, which may be remote from both the user interface 8 and the database 2 or 4, as where "dumb terminals" are used throughout the hospital.

The computer system 1 may comprise, in addition to user interfaces 8 or alternatively thereto, one or more user interface/processors 12 wherein a user interfaces communicates locally with a processor, as in a common personal computer. These user interface/processors may also be coupled with a database 2 for local data storage, as in a computer workstation 13, which may have a hard disk drive and internal data transfer to the user interface processor 12.

The invention also includes a specialized word processor 14 which, under the direction of processor 10 or user interface/processor 12, governs the creation of data records, the recognition of keywords in the data records, the composition of hypertext links between the keywords and the data records, and the retrieval of data records in response to keywords input to the word processor by the user or contained within a data record. Word processor 14 may run on a mainframe processor which is remote from user interfaces 8, or it may run on workstation 13.

A. Creating Data Records

FIGS. 2A–2D describe the operation of the present invention with particular reference to the operation of the functions of a specialized word processor for accepting and recognizing keywords input by the creator of a data record and storing the record at a predetermined location which will be referenced by a hypertext link associated with the keywords. For clarity but by way of example only, the discussion is placed in the context of a hospital "intranet" wherein the computer system of the present invention comprises multiple databases containing disparate types of patient medical records.

Figure 2A:
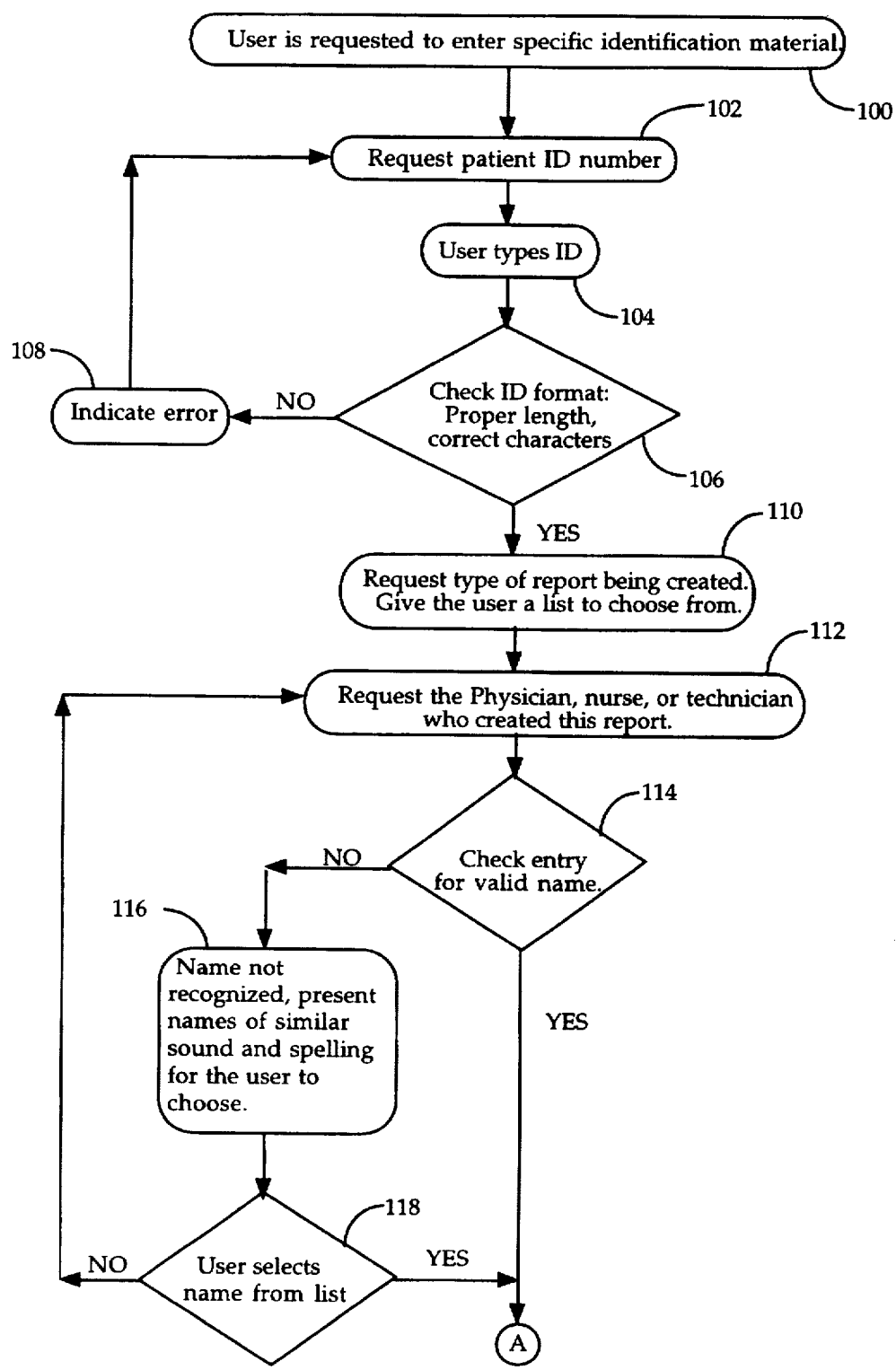
FIGS. 2A–2D are a functional flow diagram showing the steps of creating a new data record containing keywords and creating their address pointers for use with the keywords in the manner of hypertext links.

Commencing with FIG. 2A, in step 100 a user working from user interface 8 or user interface/processor 12 (FIG. 1) begins the creation of a new data record, which shall also be referred to as a "report" in the hospital context. The user is prompted by word processor 14 to enter certain information which will serve to identify the precise nature of the report. A patient identification (ID) number is requested in step 102. In response to an ID number entered by the user in step 104, word processor 14 checks the format of the ID number for the proper length and correct characters in step 106. If the format is improper, an error is indicated to the user in step 108. Otherwise, in step 110 the user is requested to enter the type of report being created. Preferably, a list of options of the various permissible types of reports is presented to the user, and the well-known "typedown" capability is provided by word processor 14, wherein each letter entered by the user causes to be displayed only those options corresponding to that letter or series of letters.

Other key information identifying a report in a hospital environment is the identity of the physician, nurse or technician creating the report, the type of report (e.g., nurse's report, discharge report, etc.), and the date and time the report was made. Steps 112, 114, 116 and 118 establish the identity of the physician or clinical staff member, and include name requesting step 112, name validation step 114, name suggestion step 116 and name selection step 118. If no valid name is entered by the user, word processor 14 displays a list of suggested names which correlate in spelling with the name attempted to be input by the user (step 116). Thereafter, only if the user selects a name from the displayed list is the user permitted to continue creating the report.

Figure 2B:
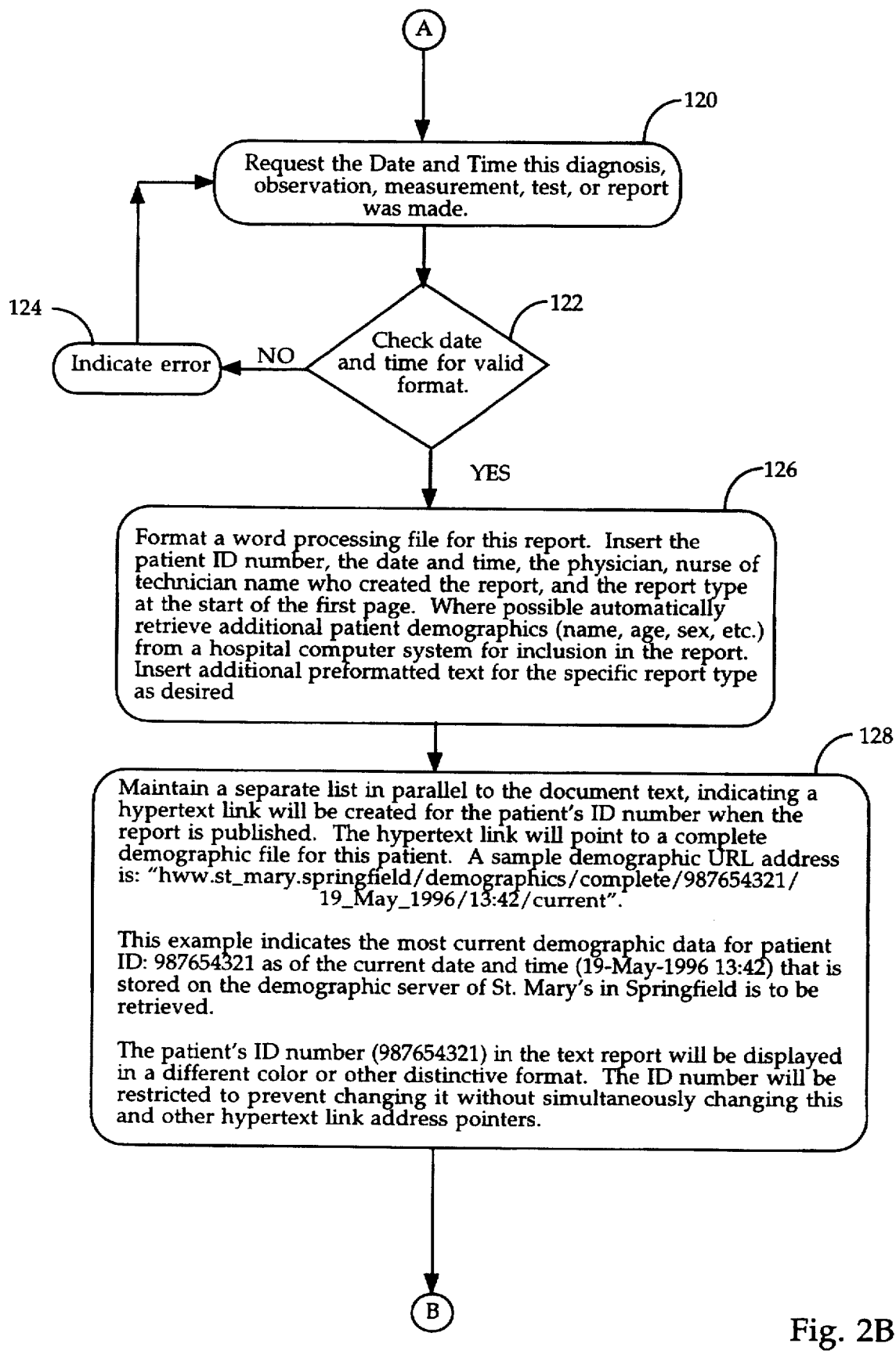

The steps of compiling the remaining initial data are shown in FIG. 2B. In step 120, word processor 14 prompts the user for the date and time of the test or observation made the subject of the data record. Steps 122 and 124 are, respectively, a date/time validation step and an error indication step for indicating an error in the format of the data or time entered by the user.

After the user enters the foregoing basic information, word processor 14 formats the report in step 126 using the user-supplied information and possibly other patient-specific or hospital-specific information on file, such as the patient's name, age, or sex, or the name of the hospital at which the patient is staying. Word processor 14 also maintains a list of keywords for establishing links to other files once the report is published. One such keyword, as shown in step 128, is the patient ID number. This keyword and its associated hypertext link will point to the complete address for a demographic file for the patient. For example, for the text, "patient ID 987654321," the address pointed to by the hypertext link may be as follows:

hww.st_mary.springfield/demographics/complete/
987654321/19_May_1996/13:42/current where "hww.st_mary.springfield" indicates the "hospital wide web" database (file server) at St. Mary's Hospital in Springfield and the remainder of the address is indicative of a current demographics file for patient ID number 987654321. The patient ID keyword thereby references the patient's complete demographic file, and the use of that same keyword in other reports on the computer system will likewise establish a link to the information contained in that demographic file by the use of a hypertext link.

Figure 2C:
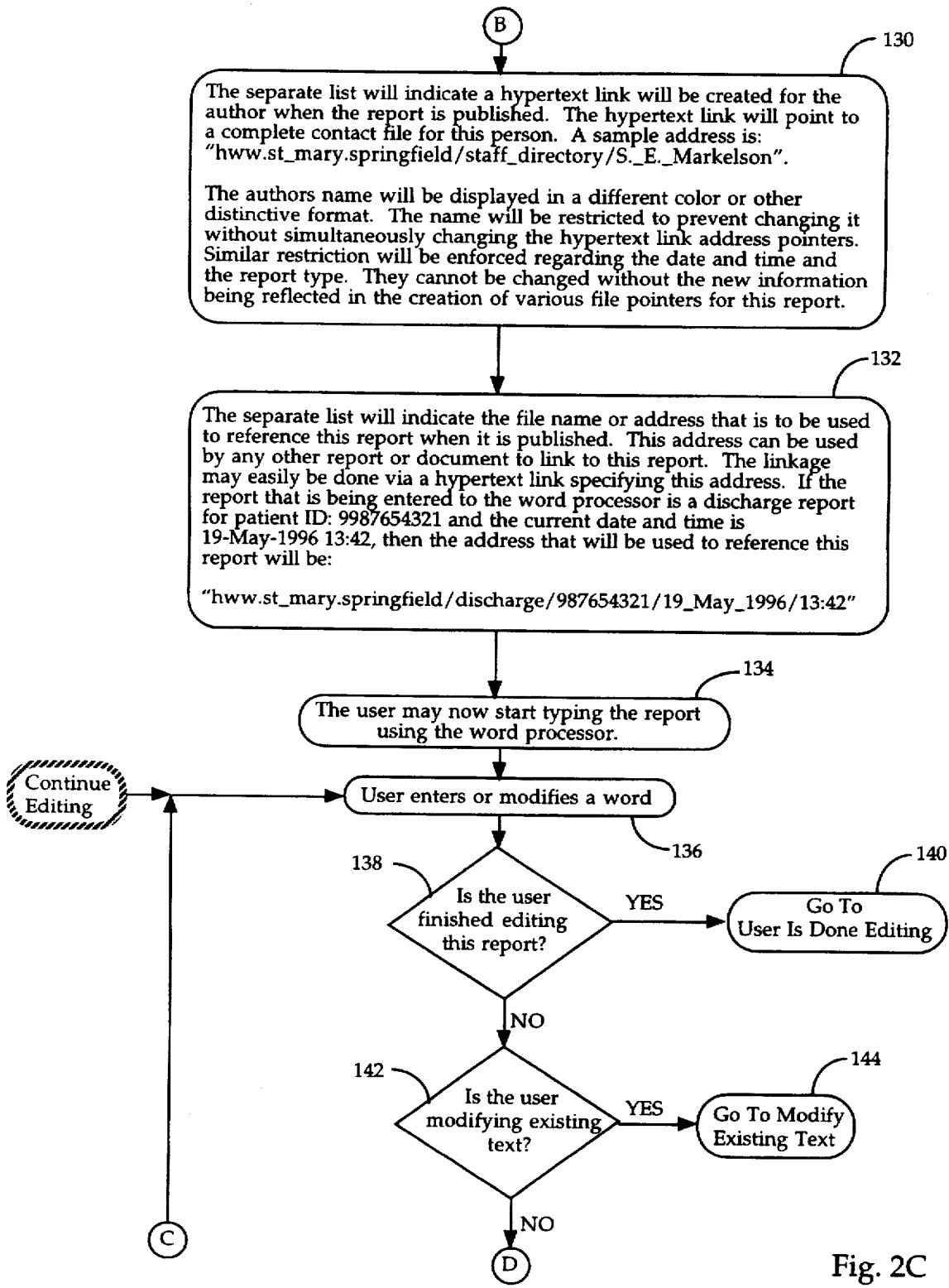

In like manner, the author of any report or data record may be treated as a keyword so that system users may easily access information concerning the author without knowing the location of that data on the system (FIG. 2C). In step 130, word processor 14 maintains a list including a pointer associated with the keyword consisting of a physician's name, where the hypertext link points to the file hw.st_mary.springfield/staff-directory/S._E._
Markelson which contains biographical and administrative information concerning the report's author, Dr. Markelson.

In addition to maintaining lists of keywords and their associated hypertext links for items such as patient ID and the name of the report's author, word processor 14 creates a linkage to the address at which the report being created will be located once it is completed and published. Step 132 in FIG. 2C includes creating this linkage for a sample patient discharge report. Step 132 describes the maintenance of a separate list containing the hypertext linkage (URL address) to a hypothetical discharge report at:

hww.st_mary's.springfield/discharge/987654321/19_
May_1996/13:42 which can then be accessed by any user using identifying keywords such as the patient ID number and the type of report (e.g., "discharge") and the current date.

In addition to creating links based on the filling of a "report type" field, the invention includes the capability to create hypertext links to other data records, including data records which have not yet been created or published for viewing by all users. When a data record (report) is being created, it is desirable to refer to other reports concerning the same patient, requiring that word processor 14 recognize keywords referencing these other reports "on the fly" as the keywords are entered by the user. For example, a physician creating a report may desire to refer to another report without reciting the actual data from that other report. Word processor 14 must therefore monitor the text entered as part of the data record to match text with predetermined keywords. In general, keywords for each type of report to be created can be developed. For example, in a hospital environment, word processor 14 can be programmed to scan for keywords such as "admission ecg," "oath report," "discharge report," etc.

Figure 2D:
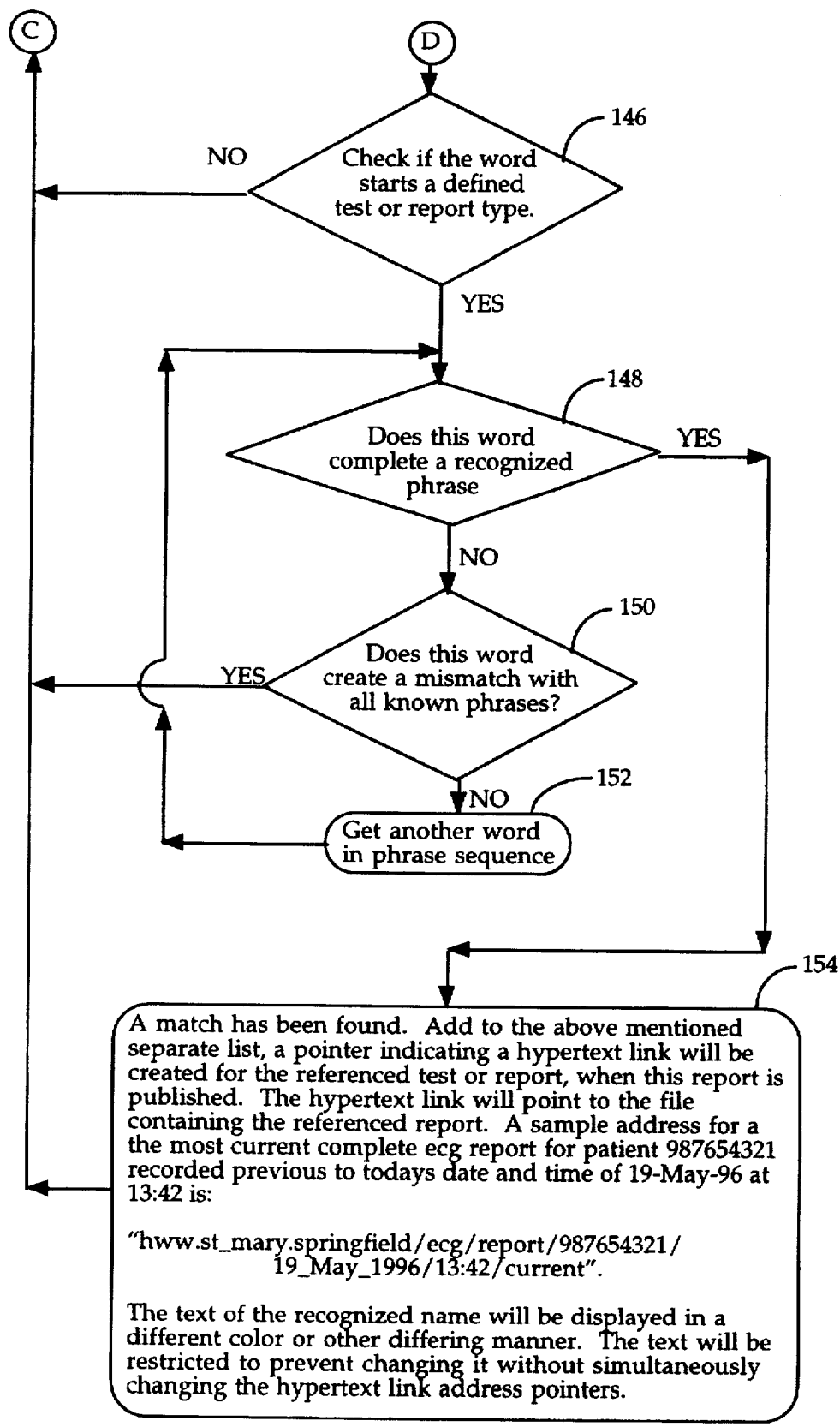

FIGS. 2C and 2D detail the monitoring function of word processor 14 whereby text being input or edited by the user is scanned to determine if the user is entering a keyword for which a hyperlink is to be created or has already been created. In step 134 and 136, the user begins typing a newly-created report or begins editing a previously published report. Until such time as the user indicates that he is finished editing the report (step 138), word processor 14 will monitor data input by the user to determine whether the user is modifying existing text (step 142). For a new report which contains no text to modify, word processor 14 proceeds to check whether each new word input by the user starts a defined keyword indicating a particular test or report type (step 146). So long as words being entered are not predetermined keywords or keyword phrases, word processor 14 returns to step 136 and continues monitoring. But if step 146 detects the beginning of a keyword, word processor 14 proceeds to determine whether a completed keyword or keyword phrase is entered (steps 148 and 150). If a keyword from a multi-word keyword phrase is correctly entered by the user, steps 152 and 148 scan successive words to determine if a keyword phrase is being entered, such as "admission ecg." If at any time a completed keyword or keyword phrase is entered by the user, step 154 declares that a match has been found and creates a hyperlink between that keyword (or keyword phrase) and the report to which it refers. A sample address for an admission electrocardiogram report created prior to May 19, 1996 for patient ID number 987654321 would be:

hww.st_mary.springfield/ecg/report/98765432 1/19_
May_1996/13:42/admission.

Where keywords appear in the text of reports or in predefined keyword fields, word processor 14 may implement a function to highlight the keywords, such as displaying them in color or other another distinctive format, as is conventionally done with hypertext references (step 154 in FIG. 2D).

When a data record containing hypertext references to other data records has been retrieved for viewing and editing, word processor 14 also treats recognized keywords or keyword phrases and their associated hypertext links as a singularity wherein the key words can no longer be edited character by character without either deleting the link (URL) associated with the keyword or changing the hypertext link to a different hypertext link. Treating these hypertext linking references as singularities provides an added measure of error control by preventing users from changing a hypertext linking reference without also changing the associated URL address to which it points.

FIG. 7 shows a sample report created using word processor 14, complete with keywords associated with links to other data records on the computer system. (Although keywords in practice are highlighted in color for easy identification, for purposes of the example of FIG. 7 keywords are shown underlined.) ID keyword 600 is associated with the unique address created in step 128 for the patient's demographic file. Author keyword 606 is associated with the unique address created in step 130 for the author's biographical file. Date keyword 602 and report type keyword 604 are associated with the unique address which will point to the report of FIG. 7. Report keywords 608 are associated with unique addresses for the records, "admission ecg," "previous ecg," "previous discharge," and "admission CK enzyme." Word processor 14 recognizes these keywords and maintains a list of the addresses of the reports to which they refer even though those reports may not yet have been created or published to other users.

B. Modifying Data Records

Figure 3A:
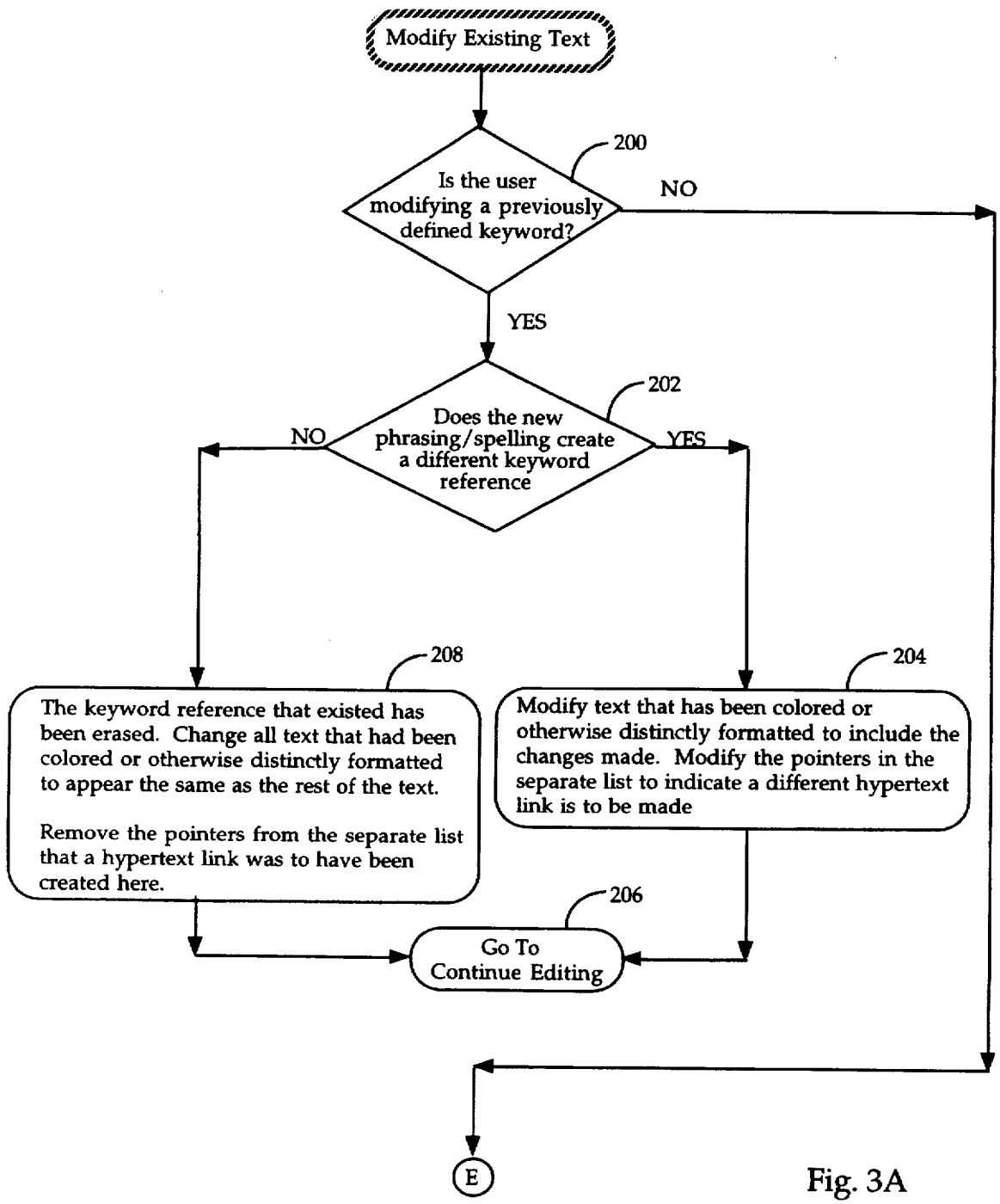
FIGS. 3A and 3B are a functional flow diagram of a word processor monitoring function for detecting when an existing record is edited so as to change keywords in the data record.
Figure 3B:
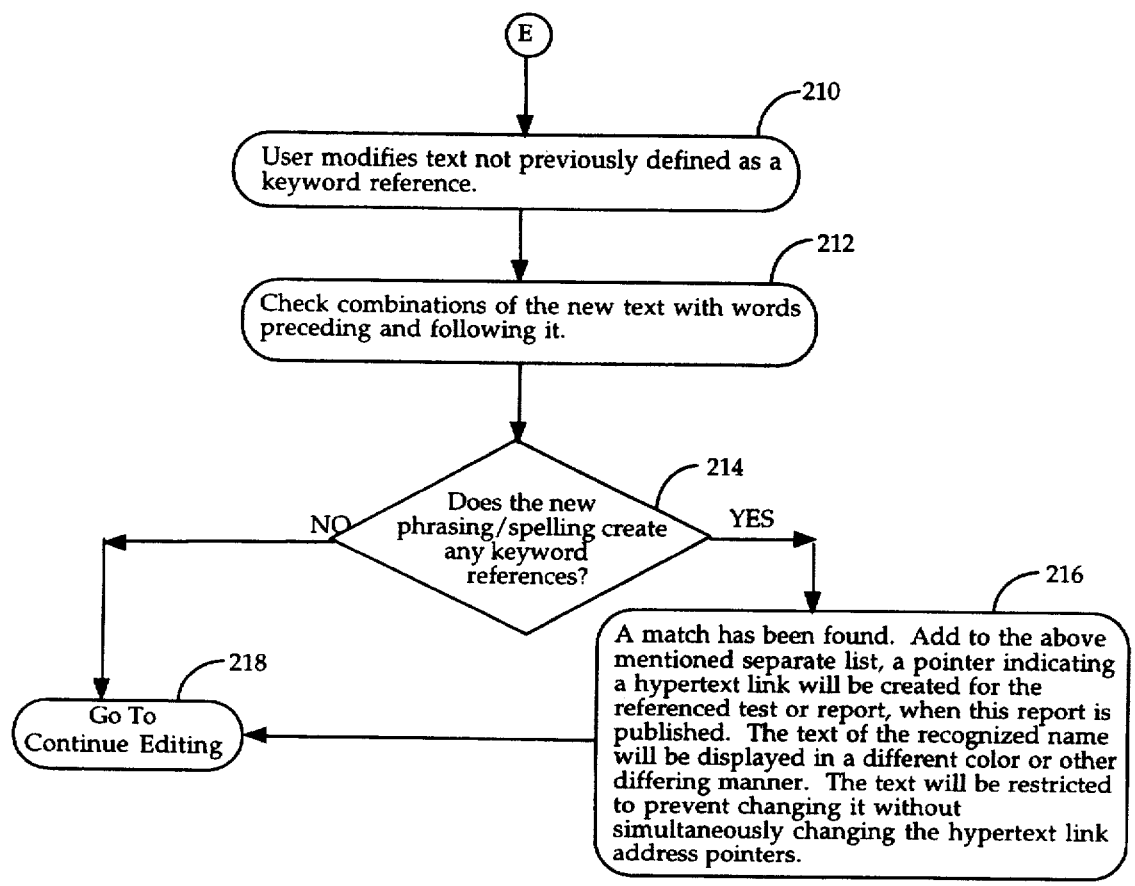

Once created and stored, any data record can be reopened for editing like any other word processing document. Referring to FIGS. 3A and 3B, the functioning of word processor 14 in response to modifications of previously stored (published or unpublished) data records is described. Step 200 determines whether the user is modifying a previously defined keyword or keyword phrase. If so, step 202 determines whether the new spelling or phrasing input by the user creates a different keyword or keyword phrase. Where a different keyword or keyword phrase is detected, step 204 permits the protected, colored text of the keyword to be updated with the new keyword while simultaneously the associated address pointer in the separate list of hypertext links is modified. Where no different keyword or keyword phrase is detected, step 208 changes the text to non-keyword (uncolored) format and deletes the associated address pointer from the separate list of hypertext links. In either case, word processor 14 then reverts to the quiescent text editing mode (step 206).

In the event that an existing data record is reopened for textual modifications but no keywords are modified, word processor 14 reacts to editing of non-keyword text (step 210) by determining if any words being modified result in new keywords or keyword phrases (steps 212 and 214). If so, a match is declared and step 216 creates a link between that keyword (or keyword phrase) and the report being created. As in step 154 of FIG. 2D, word processor 14 may implement a function to highlight the keywords and protect them from being edited character by character without either deleting the hypertext link associated with the keyword or changing the hypertext link to a different hypertext link. If no new keyword or keyword phrase is created, word processor 14 reverts to the quiescent text editing mode (step 218).

C. Storing and Publishing Data Records

Figure 4:
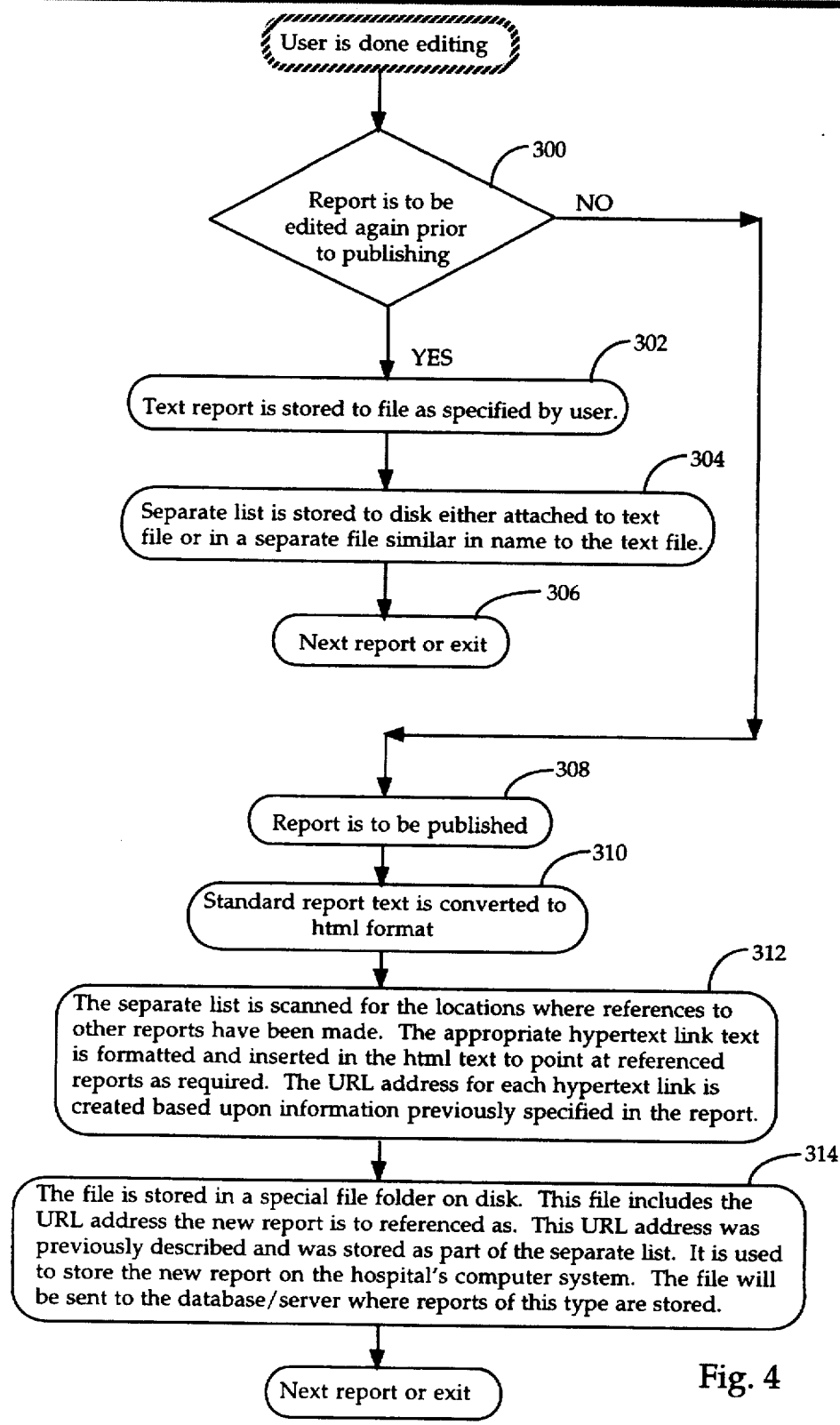
FIG. 4 is a functional flow diagram showing the creation of hypertext links between keywords in a data record and the unique address of a data record identified by each of the keywords.

Referring to FIG. 4, the invention provides the capability to store data records so that they are accessible only to the creator, and to "publish" data records so that they are available to other users on the system. Storage without publication would typically be for the purpose of reopening and modifying a data record which is not complete. Whether or not a data record is published, the storage of the data record is accompanied by the storage of a separate list of unique address pointers (URLs) referenced by and associated with the keywords in the data record.

In step 300 of FIG. 4, word processor 14 determines, based on input from the user or the current content of the report, whether the data record is to be stored without being published. If so, the textual report is stored on any database 2, 4 or 6 at an address specified by the user, (step 302). In step 304, the separate list of unique address pointers to be used as hypertext links is also stored on any database 2, 4 or 6. These pointers are preferably stored in a file with a name similar to that of the data record itself, and the filename may be identical with the exception of the filename extension. Alternatively, the separate list may be stored appended to the data record. After the user stores a data record, word processor 14 is ready to accept processing of the next report or exiting (step 306).

If the data record is to be published for availability to other users on the system, the data record text is next preferably converted to standard Hypertext Markup Language (HTML) format (step 310), thereby enabling the report to be viewed with an off-the-shelf browser suitable for viewing documents in HTML format, such as the Explorer® software package from Microsoft® or the Navigator® software package available from Netscape®.

After the data record is converted to HTML format, word processor 14 scans its corresponding separate list of unique addresses (step 312). These URLs, which define hypertext links to the other referenced reports, are formatted by word processor 14 and inserted into the HTML text of the data record to point at the referenced reports. FIG. 8 illustrates the text of the sample report of FIG. 7 after conversion to HTML format and substitution of the URLs of the referenced reports in place of the keywords entered by the user creating the report.

In step 314, word processor 14 stores the data record on any of the databases 2, 4 or 6 at a location identified by the URL address created for the record based on the ID keyword 600, author keyword 606, date keyword 602 and report type keyword 604 entered by the user. This unique address was also stored in the separate list of hyperlink URLs stored along with the data record. The resulting report, now published, can be retrieved and viewed by any user simply by either (1) entering the keyword or keyword phrase which uniquely identifies the report in response to a request by the Word processor 14, or (2) entering the keyword or keyword phrase into a report created by a compatible word processor or a browser.

For the sample report of FIGS. 7-9, an "admission report" is provided for patient ID number 987654321. The report can be retrieved by any user entering the keyword phrase "admission report" and the patient ID number "987654321," which will retrieve the admission report prior to the current date from its database storage location at:

hww.st_mary.springfield/admit_report/987654321/14_may_1996/14:19.

Reports are preferably viewed using a commercially available Internet browser. FIG. 9 illustrates the sample admission report as it is displayed by a browser, with keywords establishing hypertext links shown as underlined. The keywords "admission ecg," "previous ecg," "previous discharge cath," and "admission CK enzyme" are associated with a hypertext link to their respective reports at different URLs. A user may retrieve and view any of these reports by selecting the displayed keyword with a mouse or other pointing device. The user need not know the URL of any of these reports, and he is not even given the opportunity to retrieve the wrong report by, e.g., entering an incorrect patient ID number or report name. Moreover, the creator of the admission report has established the necessary hyperlinks to the admission ecg, previous ecg, previous discharge cath and admission CK enzyme reports without even knowing whether those reports were in existence (published or otherwise) at the time of the admission report's creation.

D. Alternative Keyword Recognition

Figure 5A:
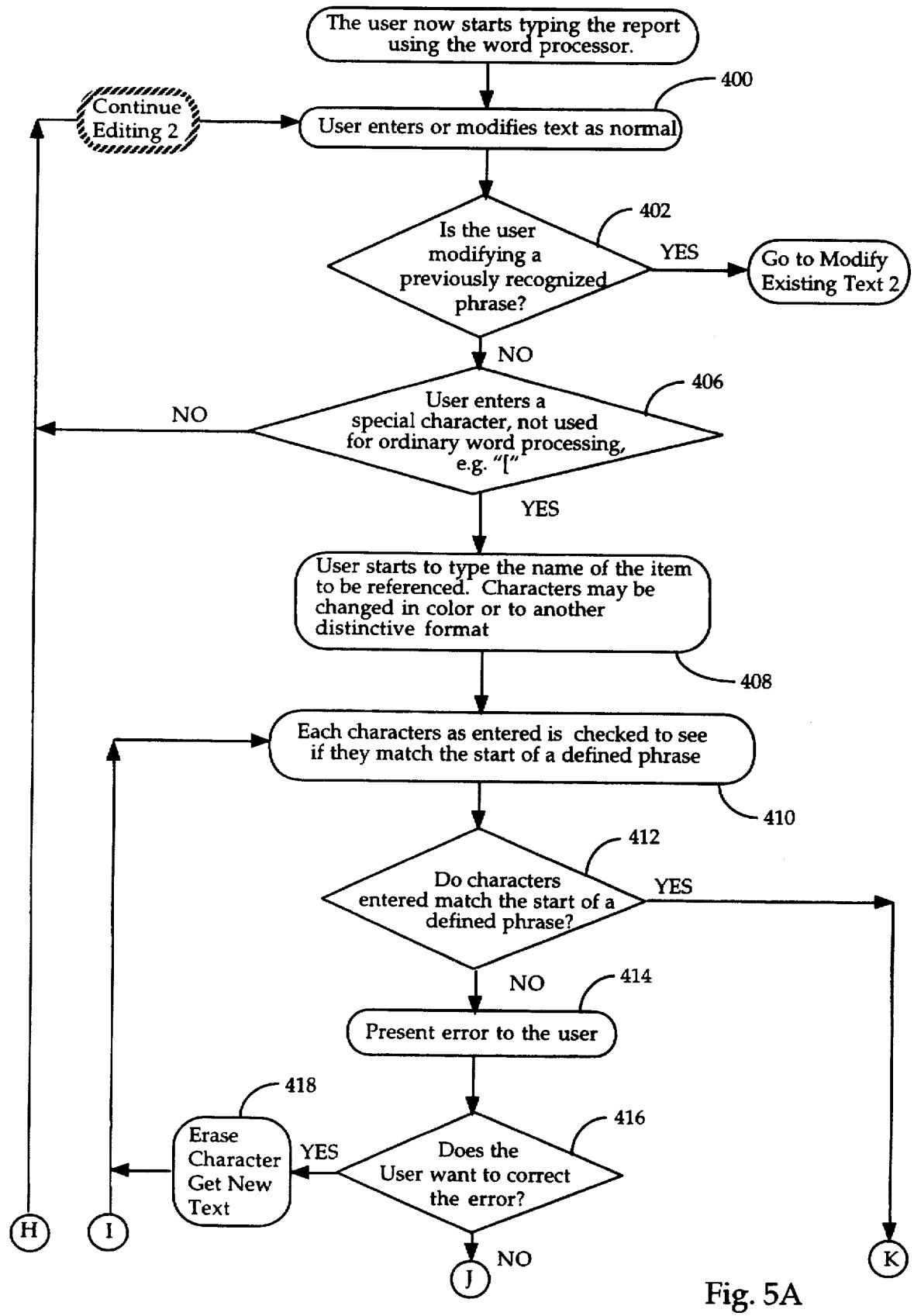
FIGS. 5A–5D are a functional flow diagram of an alternative embodiment wherein keywords entered by the user are identified by the use of a special character.
Figure 5B:
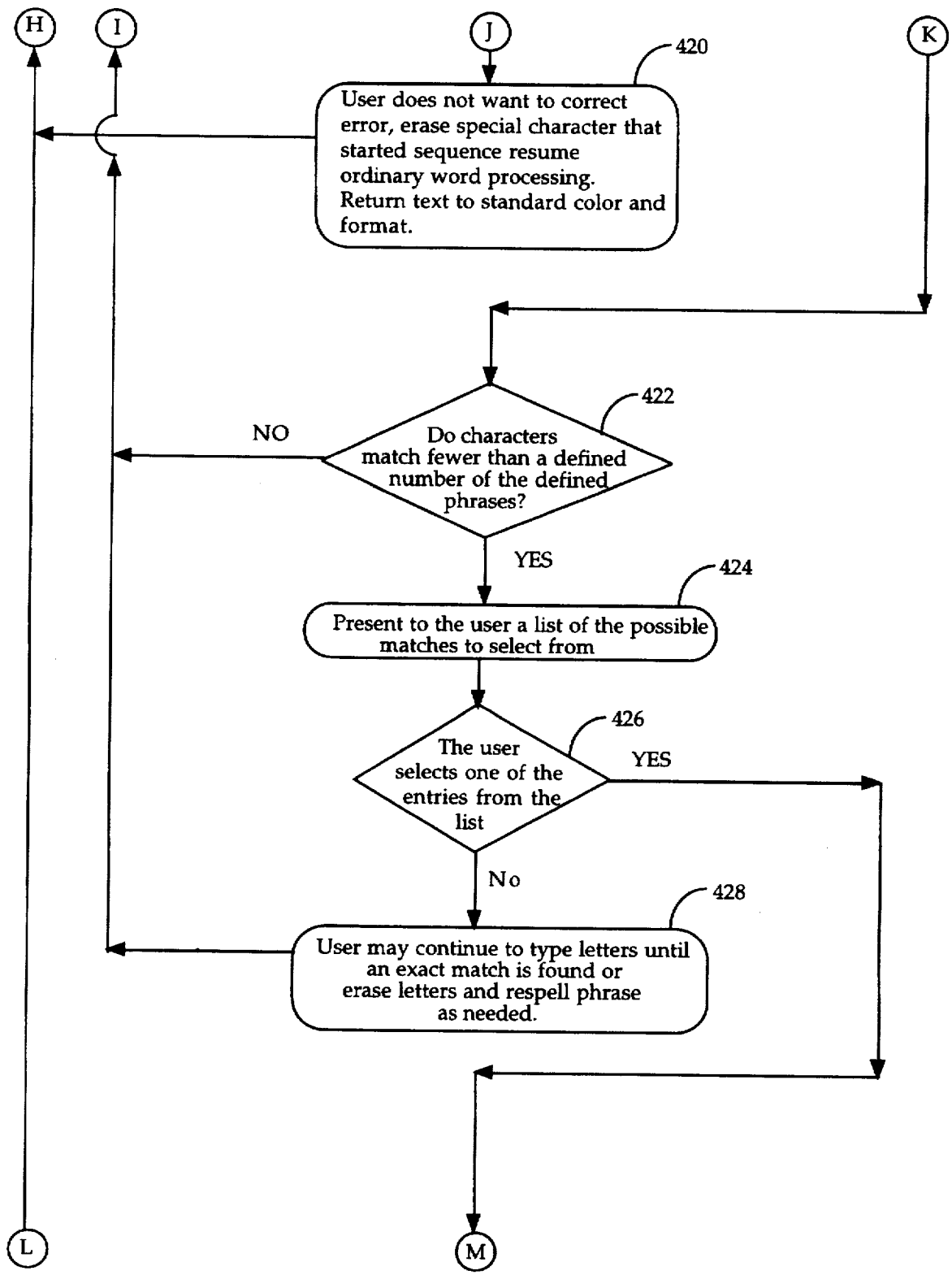

According to another aspect of the invention, FIGS. 5A–5D illustrate the capability of word processor 14 to recognize keywords and keyword phrases by the use of a special leading character entered by the user. As an alternative to steps 146–154 of FIG. 2D in which word processor 14 monitors text entered into a data record and attempts to recognize text as keywords, word processor 14 may attempt to recognize as keywords only those words which are preceded by a special character. Referring to FIG. 5A, in response to the entry or modification of text by the user (step 400), word processor 14 determines whether the user is modifying a previously entered keyword or keyword phrase (step 402). If not, word processor 14 monitors the inputted text for a special character indicating the start of a keyword (step 406). When the leading character is detected, the start of a keyword is indicated and the characters of the word or phrase being entered may be changed in color (step 408). In steps 412 and 422 (FIG. 5B), word processor 14 determines whether characters being entered following the special character match a selectable threshold number of characters from a defined keyword or keyword phrase. If so, a list of possible keyword matches is presented to the user (step 424) from which the user may select the intended keyword (step 426) if available from the list. This is the conventional "type-down" function common to word processors.

If the user selects a keyword from the list presented, word processor 14 in step 430 (FIG. 5C) declares that a match has been found, and creates a link between that keyword (or keyword phrase) and the report to which it refers, as in step 154 of FIG. 2D. Word processor 14 then reverts to monitoring new text entered by the user (step 432). Even if the user does not select a match from the list presented in step 426, the user may continue to type letters until an exact match is found, or he may respell the keywords as needed (step 428).

If word processor 14 determines in step 412 that the characters following the special character do not match the start of any defined keyword or keyword phrase, an error is presented to the user (step 414) and the user is given the opportunity to correct the error (step 416). If the user attempts to correct the error, word processor 14 in step 418 erases the erroneous characters and accepts new text entered by the user. If the user indicates that he does not want to correct the error, word processor 14 in step 420 erases the special character, returns the highlighted text to standard color or formatting, and resumes ordinary handling of text.

Figure 5C:
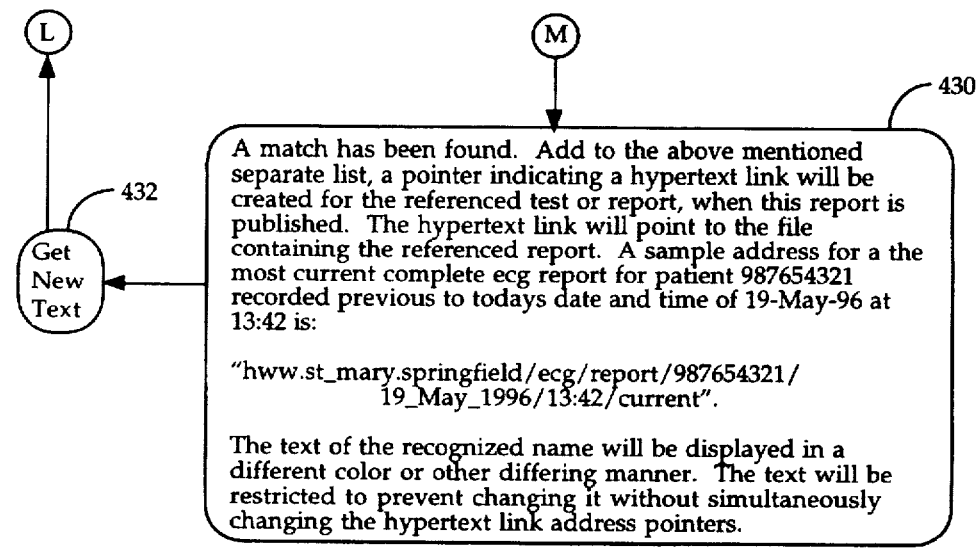
Figure 5C:
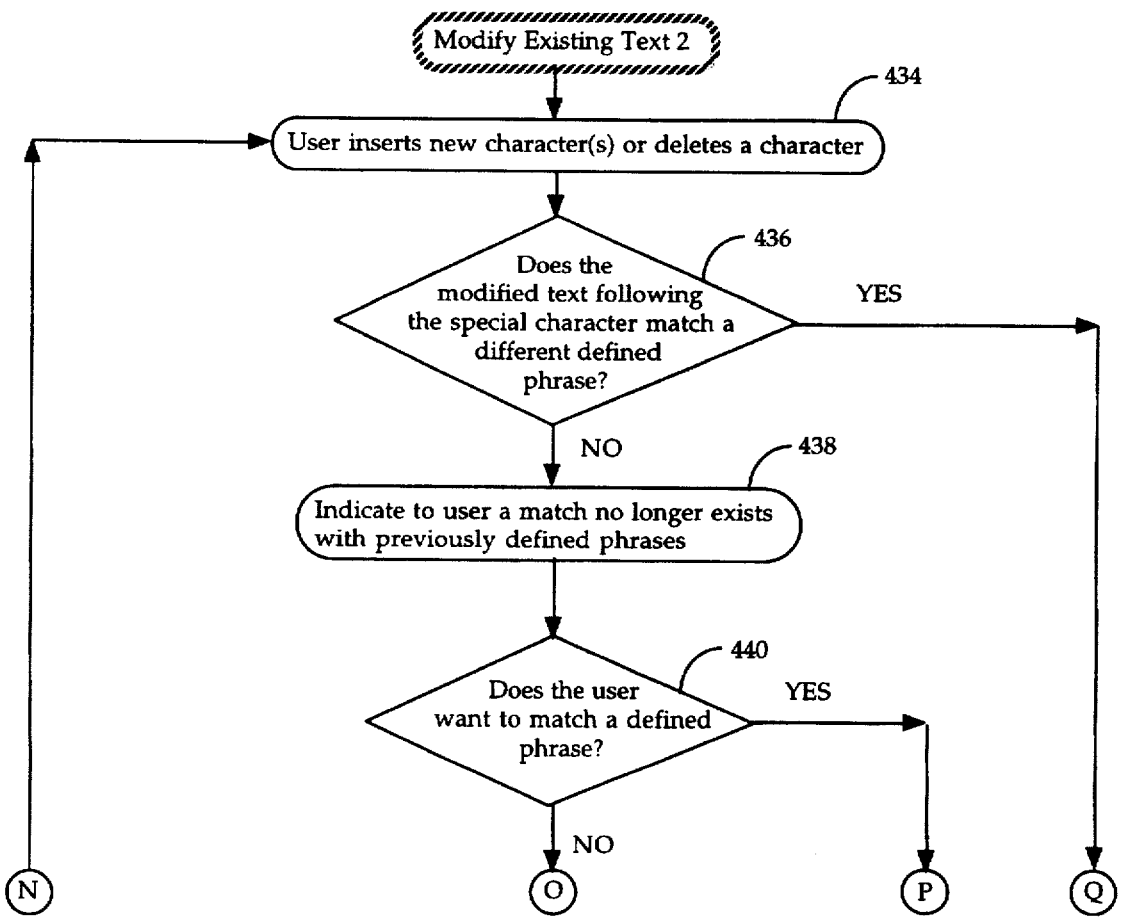
Figure 5D:
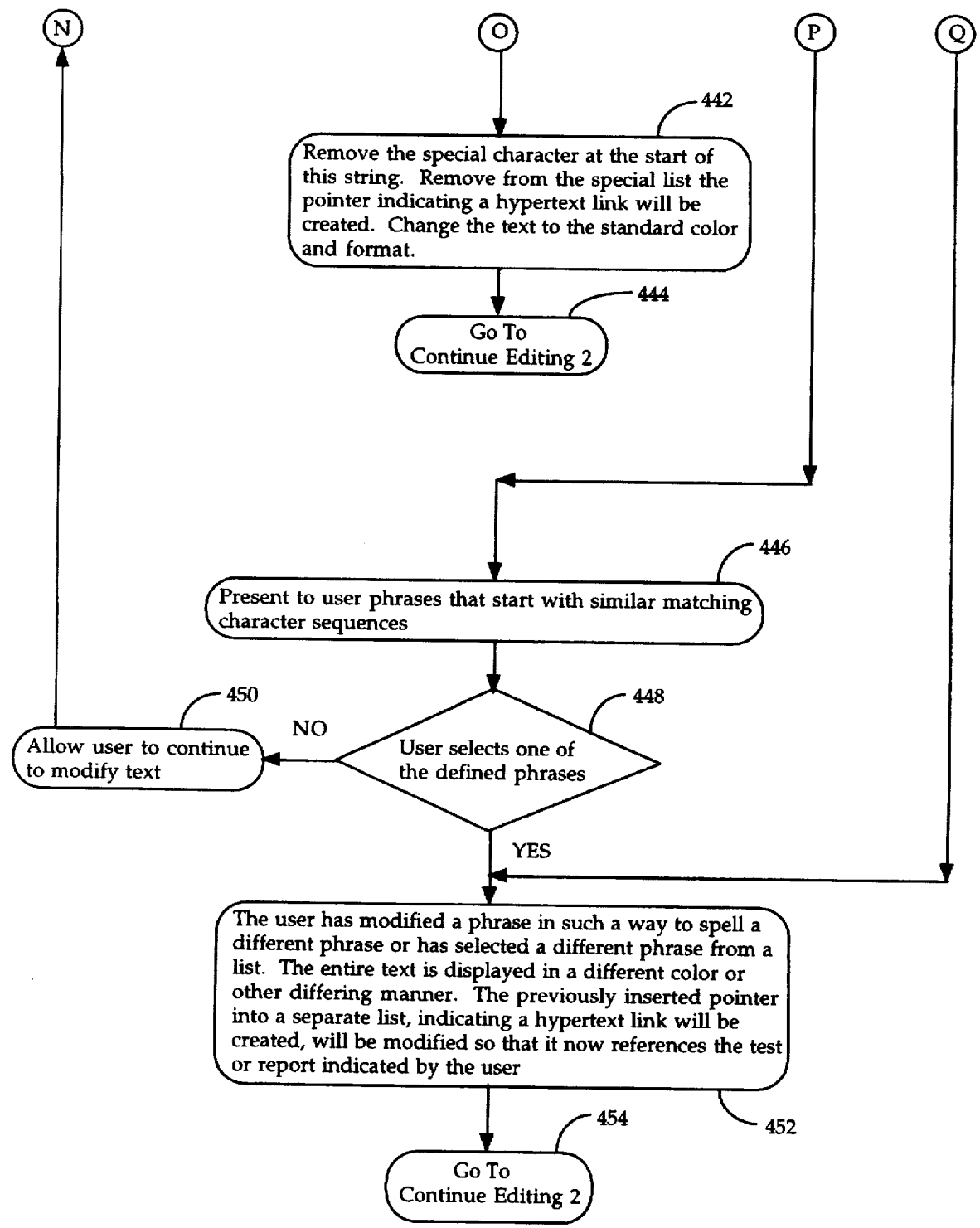

Referring to FIG. 5C, if word processor 14 detects in step 402 (FIG. 5A) that the user is modifying a previously recognized keyword, it will respond to character deletions or insertions by the user (step 434). Word processor 14 first determines whether the modified text matches a different defined keyword or keyword phrase (step 436). If so, word processor 14 indicates to the user in step 452 that a different keyword has been entered, such as by placing the text in a different color. Word processor 14 also modifies the unique address associated with the original keyword so that it points to the file location of the report which has been newly referenced by the user.

If the modified text no longer matches a predefined keyword, word processor 14 gives a suitable indication to the user (step 438) and queries whether the user wants to match a keyword (step 440). If the user indicates a desire to create a keyword match, word processor 14 presents the user with a list of keywords or keyword phrases that are similar to the text entered by the user (step 446, FIG. 5D). If the user selects from the list presented (step 448), the modified keyword is treated as previously described in accordance with step 452. Otherwise, word processor 14 allows the user to continue to modify text (step 450), and the routine proceeds at step 434 (FIG. 5C).

The foregoing use of a special character to indicate the start of a keyword or keyword phrase can be used in place of, or in conjunction with, the constant monitoring function of FIGS. 2A–2D.

E. Creating Customizable Reports from Generic Data Records

Figure 6A:
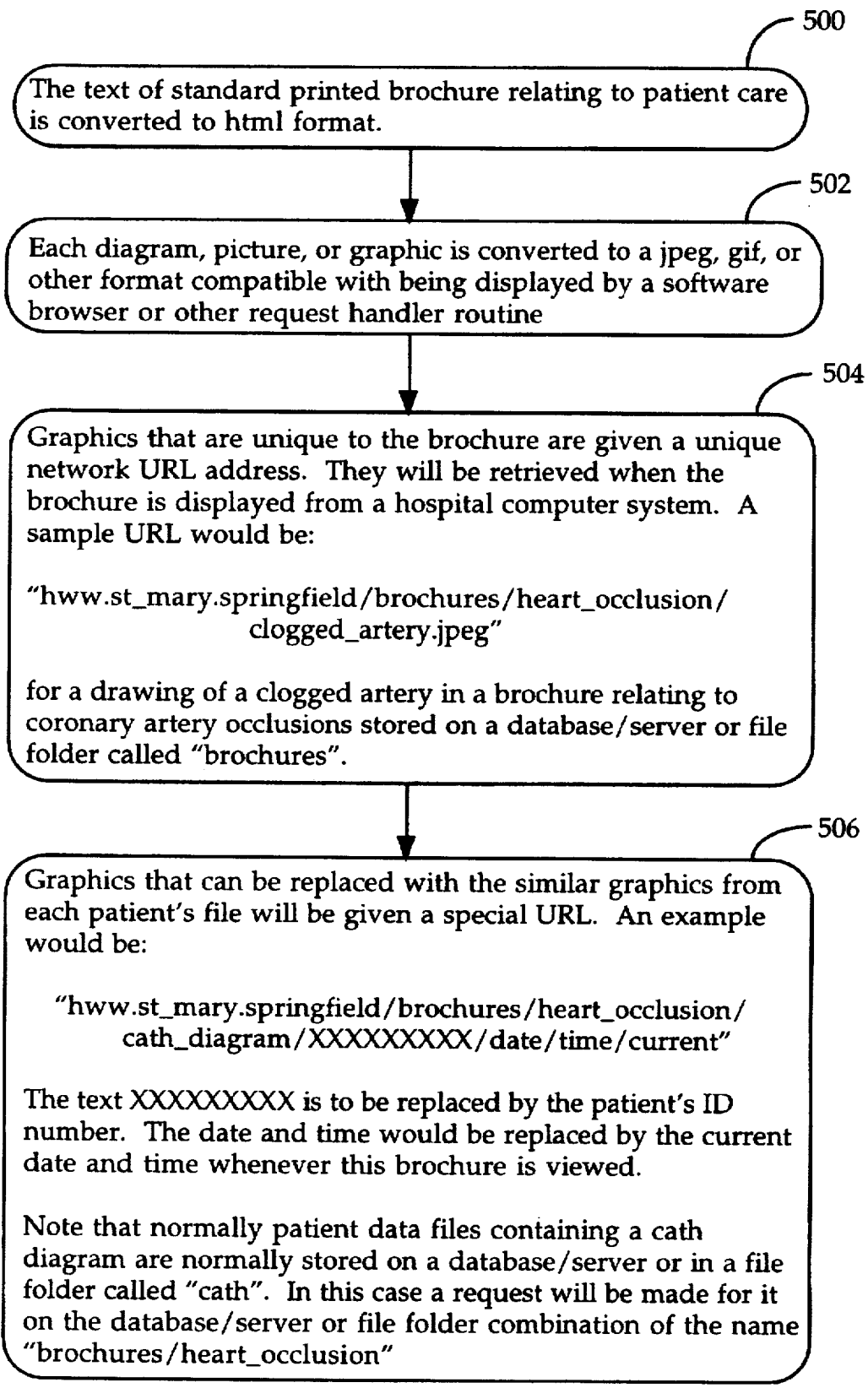
FIG. 6A is a functional flow diagram of a subroutine which uses keywords and their associated hypertext links to supplement standardized data records with particularized data.
Figure 6B:
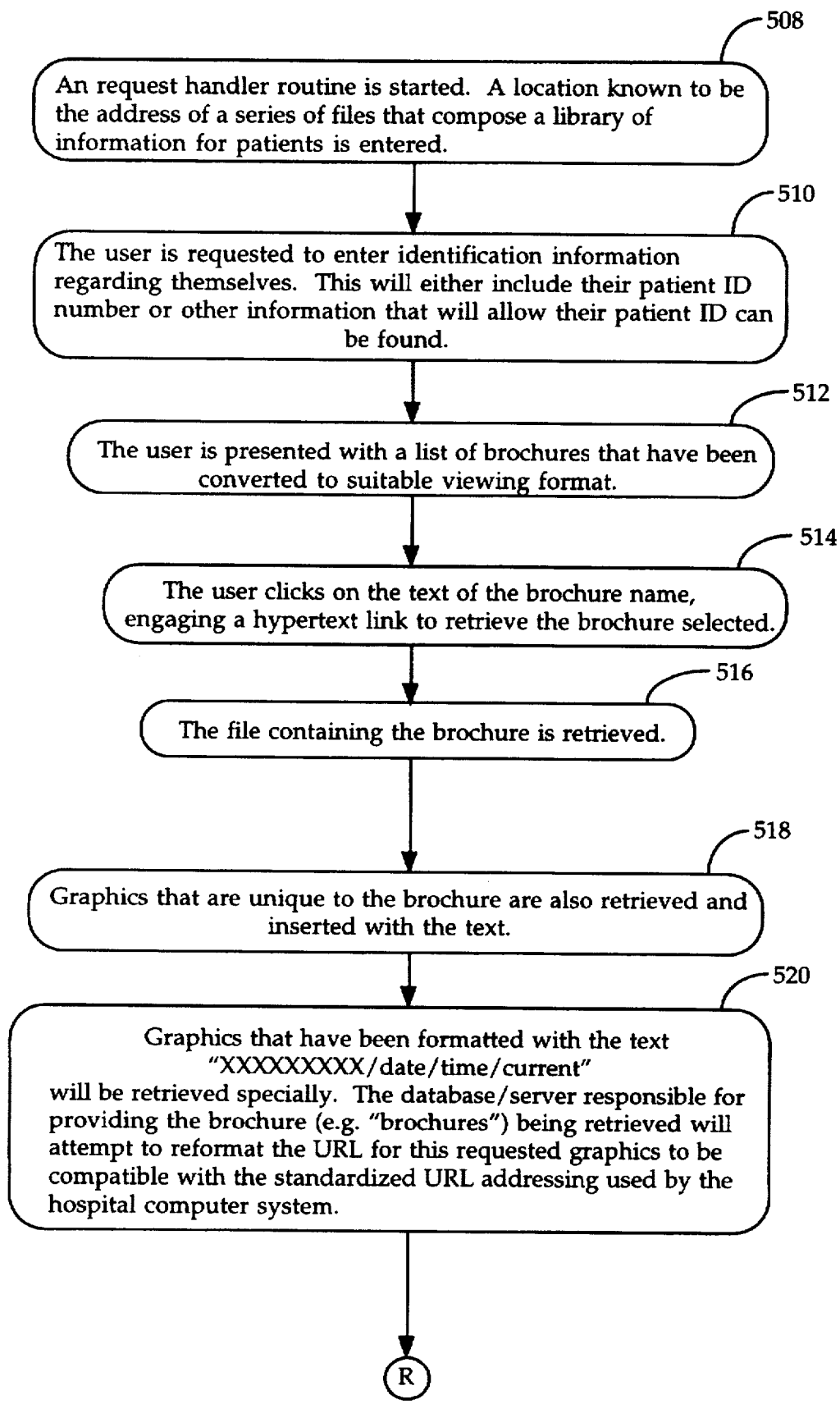
FIGS. 6B and 6C are a functional flow diagram of the process of viewing standardized data records supplemented with particularized data through the use of keywords and their associated hypertext links.
Figure 6C:
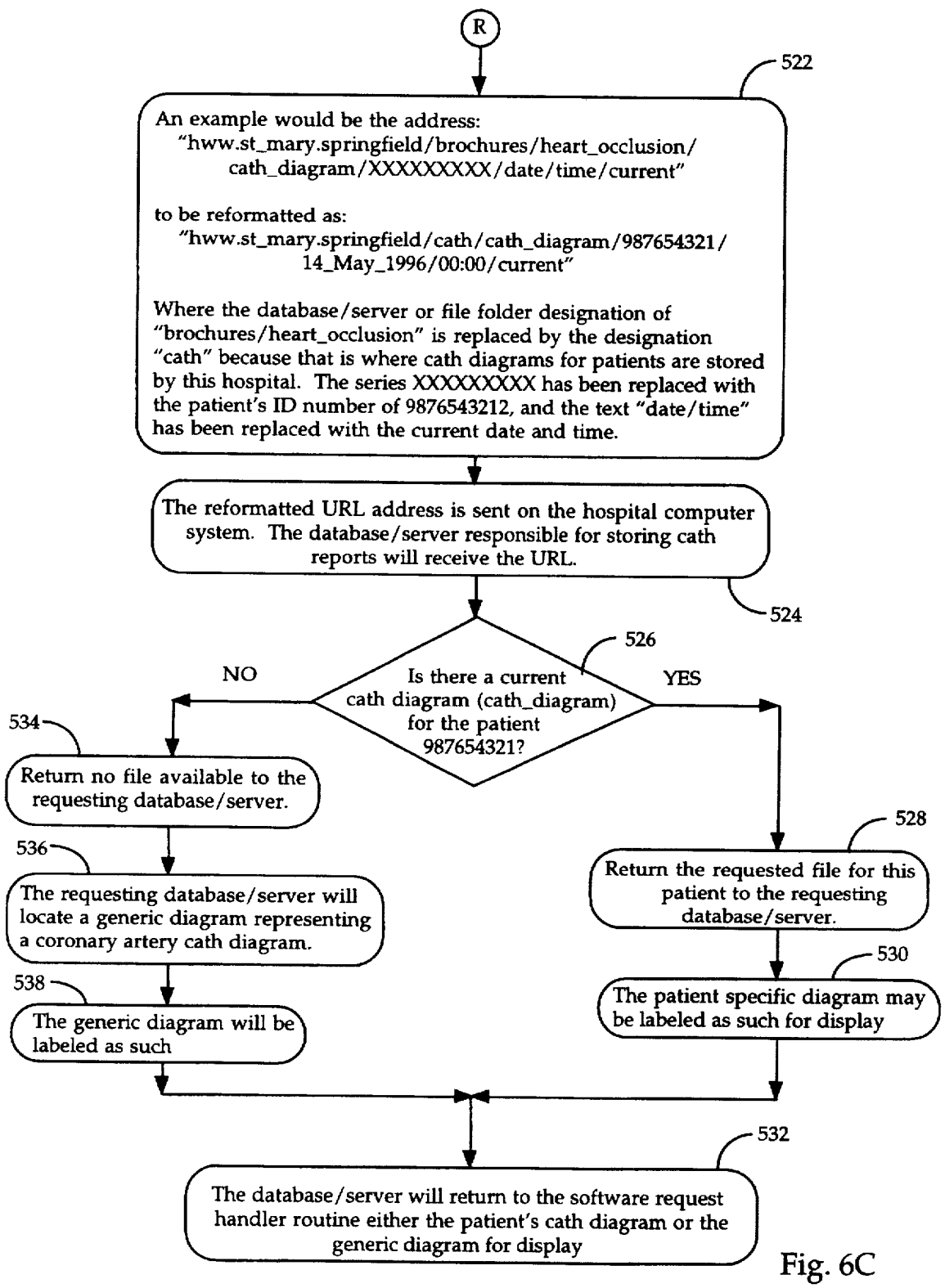

The invention is illustrated in FIGS. 6A–6C as including the capability to create customized reports from generic data records using keyword links to patient-specific data records. This aspect of the invention is well suited for use with brochures on medical care wherein it is desired to store a generic brochure and permit a patient or caregiver to retrieve the brochure and view it supplemented with medical data peculiar to a given patient. In the example below, a medical brochure concerning heart disease, and in particular clogged arteries, is used as a generic report. In the invention, keywords such as patient ID number are entered into the system by the user, and those keywords are used by the system to retrieve patient-specific medical data (in this case, medical image data consisting of a cath diagram) along with the generic brochure so that the patient-specific data is displayed as an integral part of the generic brochure. The word processor 14 creates the hypertext links which point to the unique addresses of the generic brochure, the generic data for the brochure, and the patient-specific data which is to be substituted for the generic data.

Referring now to FIG. 6A, initially the text of a standard printed medical brochure is converted to HTML format in step 500. In step 502, each graphic image of the brochure is converted to an image file format, such as JPEG, GIF or other suitable format. In step 504, each graphics file created in step 502 is stored on database 2, 4 or 6 at a unique location. In the example, an image of a clogged artery from a brochure concerning heart occlusions is stored in JPEG format at the URL:

hww.st_mary.springfield/brochures/heart_occlusion/clogged_artery.jpeg and typically other image files for this brochure are similarly stored in the directory "hww.stmary.springfield/brochures/heart_occlusion." For any graphics in the brochure which are suitable for replacement by a corresponding patient-specific image, word processor 14 assigns those files a special URL formatted like an address for a corresponding patient-specific image but devoid of patient-specific identifying material. For example, a generic cath diagram for a brochure about heart occlusions would be stored at:

hww.st_mary.springfield/brochures/heart_occlusion/cath_diagram/XXXXXXXXX/date/time/current where "XXXXXXXXX/date/time/current" will be replaced by the patient ID number and the current date and time in the address of a patient-specific cath diagram.

FIG. 6B illustrates the steps associated with retrieving and viewing a brochure by a patient. In step 508, the patient/user indicates to a software-based request handler routine that he desires to view a brochure. This request handler routine may be part of or may cooperate with an Internet browser software package; alternatively, it may be part of or cooperate with word processor 14 or another word processing program. In either case, the request handler routine prompts the user to enter information, such as the patient ID number, which will sufficiently identify the patient (step 510). The user is presented with a list of available brochures (step 512) from which he selects one in step 514 (e.g., the brochure entitled "Heart Occlusions"). The requested brochure is then retrieved (step 516), together with the various graphics images files associated with the brochure (step 518).

Referring to FIG. 6C, graphics that have been stored at a location whose address terminates in the URL segment XXXXXXXXX/data/time/current are retrieved specially and their URLs are converted to that of the patient-specific image file for the patient who is retrieving the brochure. For example, the generic cath diagram at the address hww.st_mary.springfield/brochures/heart_occlusion/
cath_diagram/XXXXXXXXX/date/time/current is replaced by the URL address hww.st_mary.springfield/cath/cath_diagram/
987654321/14_May_1996/00:00/current at the database on which the generic image is stored (steps 520, 522). This patient-specific URL is then placed on the network (step 524) for receipt by the server on which resides the database where the cath reports are stored. In step 526, it is determined whether such a patient-specific cath diagram exists. If so, the database/server returns the cath diagram for the patient (e.g., ID number 987654321) to the database/server assembling the brochure for viewing by the patient (step 528). The patient-specific diagram may be labeled as such when the brochure is assembled (step 530), and the entire brochure is then displayed to the patient (step 532). If no patient-specific cath diagram is available, the database/server responsible for storing cath reports will so indicate to the requesting database/server (step 534). The latter server will then locate a generic cath diagram for inclusion in the brochure (step 536) and it may label the generic diagram as such (step 538) before displaying the brochure to the patient (step 532).

While a particular embodiment of the invention has been illustrated and described, it will be obvious to those skilled in the art that various changes and modifications may be made without sacrificing the advantages provided by the principles of construction and operation disclosed herein.

What is claimed is:

1. A computer system enabling users to store data records on a database at predetermined addresses identified by hypertext link references, comprising:
   at least one user interface interoperable with a processor for receiving data input by a user;
   a database in communication with said processor, whereby said database may receive said data input by a user in the form of a first data record for storage; and
   a word processor running on said processor, wherein said word processor is operable to:
      recognize a first keyword phrase defining a first predetermined address at which said first data record is to be stored on the database, said keyword phrase being input by a user through said user interface when creating said first data record; and
      store said first data record at said first predetermined address on the database.

2. The computer system of claim 1, wherein said word processor is operable to recognize a second keyword phrase entered by the user into said first data record, said second keyword phrase being associated with a hypertext linking reference to a second data record.

3. The computer system of claim 2, wherein said second data record is stored at a second predetermined address on said database.

4. The computer system of claim 2, wherein said second data record has not yet been stored at a second predetermined address on said database.

5. The computer system of claim 1 further allowing a user to request the retrieval of stored data records, wherein said word processor is further operable to:
   receive a request for a stored data record;
   recognize a third keyword phrase in said request, said third keyword phrase defining a third predetermined address of a data record stored on the database; and
   retrieve said stored data record from said third predetermined address on the database.

6. The computer system of claim 5, wherein said word processor is operable to recognize a second keyword phrase entered by the user into said first data record, said second keyword phrase being associated with a hypertext linking reference to a second data record.

7. The computer system of claim 6, wherein said word processor is further operable to establish said hypertext linking reference as a singularity alterable only when said identified second keyword phrase is replaced with a different recognized keyword phrase input by said user.

8. The computer system of claim 6, wherein said second data record is stored at a second predetermined address on said database.

9. The computer system of claim 6, wherein said second data record has not yet been stored at a second predetermined address on said database.

10. The computer system of claim 9, wherein said word processor is further operable to establish said hypertext linking reference as a singularity alterable only when said identified second keyword phrase is replaced with a different recognized keyword phrase input by said user.

11. The computer system of claim 1, wherein said user input of a keyword phrase comprises selection of said keyword phrase from a list of alternatives presented to said user.

12. A computer system enabling users to store data records on a plurality of databases at unique, predetermined addresses identified by hypertext link references, comprising:
   a processor for receiving data input by a user through a user interface;
   a plurality of databases in communication with said processor, whereby said plurality of databases may receive said data input by a user in the form of a first data record for storage; and
   a word processor running on said processor, wherein said word processor is operable to:
      recognize a first keyword phrase defining a first unique predetermined address at which said first data record is to be stored on the plurality of databases, said keyword phrase being input by a user through said user interface when creating said first data record; and
      store said first data record at said first unique predetermined address on the plurality of databases.

13. The computer system of claim 12, wherein said word processor is operable to recognize a second keyword phrase entered by the user into said first data record, said second keyword phrase being associated with a hypertext linking reference to a second data record.

14. The computer system of claim 13, wherein said second data record is stored at a second unique predetermined address on said plurality of databases.

15. The computer system of claim 13, wherein said second data record has not yet been stored at a second unique predetermined address on said plurality of databases.

16. The computer system of claim 12 further allowing a user to request the retrieval of stored data records, wherein said word processor is further operable to:

receive a request for a stored data record;

recognize a third keyword phrase in said request, said third keyword phrase defining a third unique predetermined address of a third data record stored on the plurality of databases; and retrieve said stored data record from said third unique predetermined address on the plurality of databases.

17. The computer system of claim 16, wherein said word processor is operable to recognize a second keyword phrase entered by the user into said first data record, said second keyword phrase being associated with a hypertext linking reference to a second data record.

18. The computer system of claim 17, wherein said word processor is further operable to establish said hypertext linking reference as a singularity alterable only when said identified second keyword phrase is replaced with a different recognized keyword phrase input by said user.

19. The computer system of claim 17, wherein said second data record is stored at a second unique predetermined address on said plurality of databases.

20. The computer system of claim 17, wherein said second data record has not yet been stored at a second unique predetermined address on said plurality of databases.

21. The computer system of claim 20, wherein said word processor is further operable to establish said hypertext linking reference as a singularity alterable only when said identified second keyword phrase is replaced with a different recognized keyword phrase input by said user.

22. The computer system of claim 12, wherein said user input of a keyword phrase comprises selection of said keyword phrase from a list of alternatives presented to said user.

23. A hospital computer system enabling users to store and retrieve different types of patient data records on a plurality of databases at unique, predetermined addresses identified by hypertext link references, comprising:

a processor for receiving data input by a user through a user interface;

a plurality of databases in communication with said processor, whereby said plurality of databases may receive said data input by a user in the form of a first data record for storage; and a word processor running on said processor, wherein said word processor is operable to:

(a) recognize a first keyword phrase defining a first unique predetermined address at which said first data record is to be stored on the plurality of databases, said keyword phrase being input by a user through said user interface when creating said first data record;

(b) recognize a second keyword phrase entered by the user into said first data record, said second keyword phrase being associated with a hypertext linking reference to a second data record stored at a second unique predetermined address on said plurality of databases;

(c) establish said hypertext linking reference as a singularity alterable only when said identified second keyword phrase is replaced with a different recognized keyword phrase input by said user;

(d) store said first data record at said first unique predetermined address on the plurality of databases;

(e) receive a request for a stored data record;

(f) recognize a third keyword phrase in said request, said third keyword phrase defining a third unique predetermined address of a data record stored on the plurality of databases; and (g) retrieve said stored data record from said third unique predetermined address on the plurality of databases.

24. The hospital computer system of claim 23, wherein said user input of keyword phrases comprises selection of said keyword phrase from a list of alternatives presented to said user.

25. In a computer system having a database, a method of storing data records on the database at predetermined addresses identified by hypertext link references, comprising the steps of:

providing at least one user interface and a processor interoperable therewith to receive data input by a user;

providing a database in communication with said processor, whereby said database may receive said data input by a user in the form of a first data record for storage;

receiving a first keyword phrase defining a first predetermined address at which said first data record is to be stored on the database, said keyword phrase being input by a user through said user interface when creating said first data record; and storing said first data record at said first predetermined address on the database.

26. The method of claim 25, further comprising the step of recognizing a second keyword phrase entered by the user into said first data record, said second keyword phrase being associated with a hypertext linking reference to a second data record.

27. The method of claim 26, wherein said second data record is stored at a second predetermined address on said database.

28. The method of claim 26, wherein said second data record has not yet been stored at a second predetermined address on said database.

29. The method of claim 25, further comprising the steps of:

receiving a request for a stored data record;

recognizing a third keyword phrase in said request, said third keyword phrase defining a third predetermined address of a data record stored on the database; and retrieving said stored data record from said third predetermined address on the database.

30. The method of claim 29, further comprising the step of recognizing a second keyword phrase entered by the user into said first data record, said second keyword phrase being associated with a hypertext linking reference to a second data record.

31. The method of claim 30, further comprising the step of establishing said hypertext linking reference as a singularity alterable only when said identified second keyword phrase is replaced with a different recognized keyword phrase input by said user.

32. The method of claim 30, wherein said second data record is stored at a second predetermined address on said database.

33. The method of claim 30, wherein said second data record has not yet been stored at a second predetermined address on said database.

34. The method of claim 33, further comprising the step of establishing said hypertext linking reference as a singularity alterable only when said identified second keyword phrase is replaced with a different recognized keyword phrase input by said user.

35. The method of claim 25, wherein said user input of a keyword phrase comprises selection of said keyword phrase from a list of alternatives presented to said user.

36. In a computer system having a plurality of databases, a method of storing data records on the plurality of databases at unique, predetermined addresses identified by hypertext link references, comprising the steps of:

providing a user interface and a processor interoperable therewith to receive data input by a user;

providing a plurality of databases in communication with said processor, whereby said plurality of databases may receive said data input by a user in the form of a first data record for storage;

recognizing a first keyword phrase defining a first unique predetermined address at which said first data record is to be stored on the plurality of databases, said keyword phrase being input by a user through said user interface when creating said first data record; and storing said first data record at said first unique predetermined address on the plurality of databases.

37. The method of claim 36, further comprising the step of recognizing a second keyword phrase entered by the user into said first data record, said second keyword phrase being associated with a hypertext linking reference to a second data record.

38. The method of claim 37, wherein said second data record is stored at a second unique predetermined address on said plurality of databases.

39. The method of claim 37, wherein said second data record has not yet been stored at a second unique predetermined address on said plurality of databases.

40. The method of claim 36, further comprising the steps of:

receiving a request for a stored data record;

recognizing a third keyword phrase in said request, said third keyword phrase defining a third unique predetermined address of a third data record stored on the plurality of databases; and retrieving said stored data record from said third unique predetermined address on the plurality of databases.

41. The method of claim 40, further comprising the step of recognizing a second keyword phrase entered by the user into said first data record, said second keyword phrase being associated with a hypertext linking reference to a second data record.

42. The method of claim 41, further comprising the step of establishing said hypertext linking reference as a singularity alterable only when said identified second keyword phrase is replaced with a different recognized keyword phrase input by said user.

43. The method of claim 41, wherein said second data record is stored at a second unique predetermined address on said plurality of databases.

44. The method of claim 41, wherein said second data record has not yet been stored at a second unique predetermined address on said plurality of databases.

45. The method of claim 44, further comprising the step of establishing said hypertext linking reference as a singularity alterable only when said identified second keyword phrase is replaced with a different recognized keyword phrase input by said user.

46. The method of claim 36, wherein said user input of a keyword phrase comprises selection of said keyword phrase from a list of alternatives presented to said user.

47. In a hospital computer system having a plurality of databases, a method of storing and retrieving different types of patient data records on the plurality of databases at unique, predetermined addresses identified by hypertext link references, comprising the steps of:

providing a user interface and a processor interoperable therewith to receive data input by a user;

providing a plurality of databases in communication with said processor, whereby said plurality of databases may receive said data input by a user in the form of a first data record for storage;

recognizing a first keyword phrase defining a first unique predetermined address at which said first data record is to be stored on the plurality of databases, said keyword phrase being input by a user through said user interface when creating said first data record;

recognizing a second keyword phrase entered by the user into said first data record, said second keyword phrase being associated with a hypertext linking reference to a second data record stored at a second unique predetermined address on said plurality of databases;

establishing said hypertext linking reference as a singularity alterable only when said identified second keyword phrase is replaced with a different recognized keyword phrase input by said user;

storing said first data record at said first unique predetermined address on the plurality of databases;

receiving a request for a stored data record;

recognizing a third keyword phrase in said request, said third keyword phrase defining a third unique predetermined address of a data record stored on the plurality of databases; and retrieving said stored data record from said third unique predetermined address on the plurality of databases.

48. The method of claim 47, wherein said user input of keyword phrases comprises selection of said keyword phrases from a list of alternatives presented to said user.

49. A computer system enabling users to reference data records on a database using hyperlinks, comprising:

at least one user interface interoperable with a processor for receiving data input by a user;

a word processor running on said processor;

a database in communication with said processor and storing a plurality of data records;

wherein said word processor is operable to recognize a first keyword phrase as said keyword phrase is input by a user through said user interface, said keyword phrase being associated with a hypertext linking reference to at least one of said data records, said word processor further operable to establish said hypertext linking reference as a singularity which is removable when said keyword phrase is altered.

50. The computer system of claim 49, wherein said keyword phrase alteration results in a new hypertext linking reference when said identified keyword phrase is replaced with a different recognized keyword phrase.

51. The computer system of claim 50, wherein said new hypertext linking reference is a singularity removable when said different recognized keyword phrase is altered.

52. The computer system of claim 49, wherein said user input of a keyword phrase comprises selection of said keyword phrase from a list of alternatives presented to said user.

53. A computer system enabling users to create hypertext linking references between a first data record and a second data record stored on at least one database, comprising:

at least one user interface interoperable with a processor for receiving data input by a user in the form of a first data record;

at least one database in communication with said processor for storing a plurality of data records; and a word processor running on said processor, wherein said word processor is operable to:

recognize a first keyword phrase input by a user through said user interface when creating said first data record; and recognize a second keyword phrase entered by the user into said first data record, said first keyword phrase and said second keyword phrase establishing a first hypertext linking reference to a second data record stored on said at least one database.

54. The computer system of claim 53, wherein said first keyword phrase defines a predetermined address at which said first data record is stored on said at least one database.

55. The computer system of claim 54, further comprising a third data record including a third keyword phrase, said word processor operable to recognize said first and third keyword phrases and create a second hypertext linking reference to said predetermined address for storing said first data record.

56. The computer system of claim 53, wherein said second keyword phrase is presented in an alternate textual format when recognized by the word processor.

57. The computer system of claim 56, wherein said word processor is further operable to establish said hypertext linking reference as a singularity which is removable when said second keyword phrase is altered.

58. The computer system of claim 57, wherein said alternate textual format is removed when said second keyword phrase is altered.

59. The computer system of claim 56, wherein said word processor is further operable to establish said hypertext linking reference as a singularity which is removable when said first keyword phrase is altered.

60. The computer system of claim 53, wherein said user input of keyword phrases comprises selection of said keyword phrases from a list of alternatives presented to said user.

\* \* \* \* \*

UNITED STATES PATENT AND TRADEMARK OFFICE
CERTIFICATE OF CORRECTION

PATENT NO. : 5,895,461
DATED : April 20, 1999
INVENTOR(S) : Carlos de la Huerga et al.

It is certified that error appears in the above-indentified patent and that said Letters Patent is hereby corrected as shown below:

At Col. 7, lines 46-49, delete:
"hw.st_mary.springfield/staff-directory/S._E._
   Markelson which contains biographical and adminis-
   trative information concerning the report's author, Dr.
   Markelson."
and insert therefor:
 --hww.st_mary.springfield/staff-directory/S._E._
      Markelson
which contains biographical and administrative information concerning the report's
author, Dr. Markelson.--

At Col. 8, line 14, delete "oath" and insert therefor --cath--; line 45, delete the blank space between "98765432" and "1"

At Col. 10, line 40, delete "Word" and insert therefor --word--.

Signed and Sealed this

Twelfth Day of October, 1999

Attest:

Q. TODD DICKINSON

*Attesting Officer*     *Acting Commissioner of Patents and Trademarks*